United States Patent [19]
Moriau et al.

[11] Patent Number: 6,006,486
[45] Date of Patent: Dec. 28, 1999

[54] FLOOR PANEL WITH EDGE CONNECTORS

[75] Inventors: Stefan Simon Gustaaf Moriau, Gent; Mark Gaston Maurits Cappelle, Staden; Bernard Paul Joseph Thiers, Oostrozebeke, all of Belgium

[73] Assignee: Unilin Beheer BV, besloten vennootschap, Ijssel, Netherlands

[21] Appl. No.: 08/872,044

[22] Filed: Jun. 10, 1997

[30] Foreign Application Priority Data

Jun. 11, 1996 [BE] Belgium ................................ 09600527
Apr. 15, 1997 [BE] Belgium ................................ 09700344

[51] Int. Cl.$^6$ ................................................ E04B 2/08
[52] U.S. Cl. .................... 52/589.1; 52/592.1; 52/586.1; 52/590.2; 52/592.3
[58] Field of Search ............................. 52/578 B, 589.1, 52/592.1, 570, 571, 572, 590.2, 586.1, 592.3, 591.1, 590.1

[56] References Cited

U.S. PATENT DOCUMENTS

| | | |
|---|---|---|
| 753,791 | 3/1904 | Fulghum . |
| 1,124,228 | 1/1915 | Houston . |
| 1,986,739 | 1/1935 | Mitte . |
| 2,276,071 | 3/1942 | Scull . |
| 2,740,167 | 4/1956 | Rowley . |
| 3,310,919 | 3/1967 | Bue et al. . |
| 3,538,665 | 11/1970 | Gohner . |
| 3,694,983 | 10/1972 | Couquet . |
| 3,859,000 | 1/1975 | Webster . |
| 4,769,963 | 9/1988 | Meyerson . |
| 5,216,861 | 6/1993 | Meyerson . |
| 5,295,341 | 3/1994 | Kajiwara . |
| 5,349,796 | 9/1994 | Meyerson . |
| 5,706,621 | 1/1998 | Pervan . |

FOREIGN PATENT DOCUMENTS

| | | |
|---|---|---|
| 417526 | 11/1936 | Belgium . |
| 1298043 | 4/1962 | France . |
| 84 12178 | 1/1986 | France . |
| 88 05081 | 10/1989 | France . |
| 92 12882 | 4/1994 | France . |
| 7102476 | 1/1971 | Germany . |
| 1 534 278 | 11/1971 | Germany . |
| 7402354 | 5/1974 | Germany . |
| 25 02 992 | 7/1976 | Germany . |
| 26 16 077 | 10/1977 | Germany . |
| 30 41781 A1 | 6/1982 | Germany . |
| 86 04 004 | 6/1986 | Germany . |
| 35 12 204 | 10/1986 | Germany . |
| 35 44845 A1 | 6/1987 | Germany . |
| 42 15 273 | 11/1993 | Germany . |
| 42 42 530 | 6/1994 | Germany . |
| 54-65528 | 5/1979 | Japan . |
| 57-119056 | 7/1982 | Japan . |
| 3-169967 | 7/1991 | Japan . |
| 6-56310 | 8/1994 | Japan . |
| 7-180333 | 7/1995 | Japan . |
| 501 914 | 10/1994 | Sweden . |
| 200949 | 11/1938 | Switzerland . |
| 424057 | 2/1935 | United Kingdom . |
| 1 430 423 | 3/1976 | United Kingdom . |
| 2 117 813 | 10/1983 | United Kingdom . |
| 2 243 381 | 10/1991 | United Kingdom . |
| 2 256 023 | 11/1992 | United Kingdom . |
| WO 84/-2158 | 6/1984 | WIPO . |
| WO 84/02155 | 6/1984 | WIPO . |
| WO 93/13280 | 7/1993 | WIPO . |
| WO 94/01628 | 1/1994 | WIPO . |
| WO 94/26999 | 11/1994 | WIPO . |
| WO 96/27719 | 9/1996 | WIPO . |
| WO 96/27721 | 9/1996 | WIPO . |

*Primary Examiner*—Carl D. Friedman
*Assistant Examiner*—Yvonne Horton-Richardson
*Attorney, Agent, or Firm*—Bacon & Thomas, PLLC

[57] ABSTRACT

Floor covering, including hard floor panels (1) which, at least at the edges of two opposite sides (2-3, 26-27), are provided with coupling parts (4-5, 28-29), cooperating which each other, substantially in the form of a tongue (9-31) and a groove (10-32), wherein the coupling parts (4-5, 28-29) are provided with integrated mechanical locking elements (6) which prevent the drifting apart of two coupled floor panels in a direction (R) perpendicular to the related edges (2-3, 26-27) and parallel to the underside (7) of the coupled floor panels (1).

66 Claims, 10 Drawing Sheets

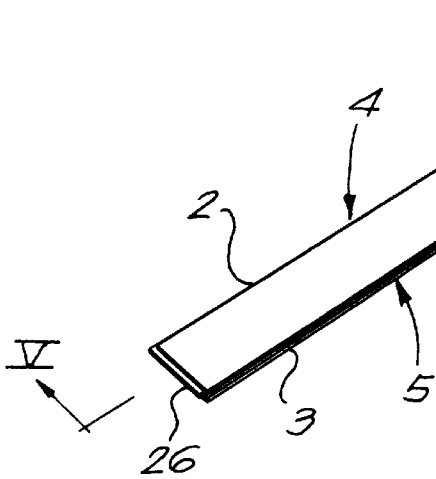
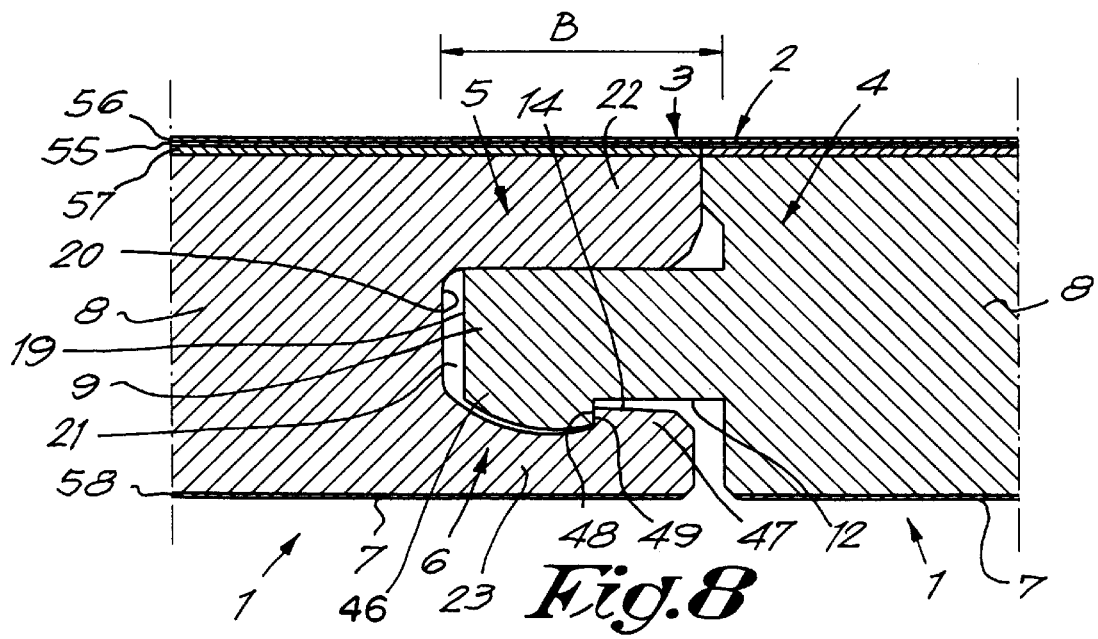

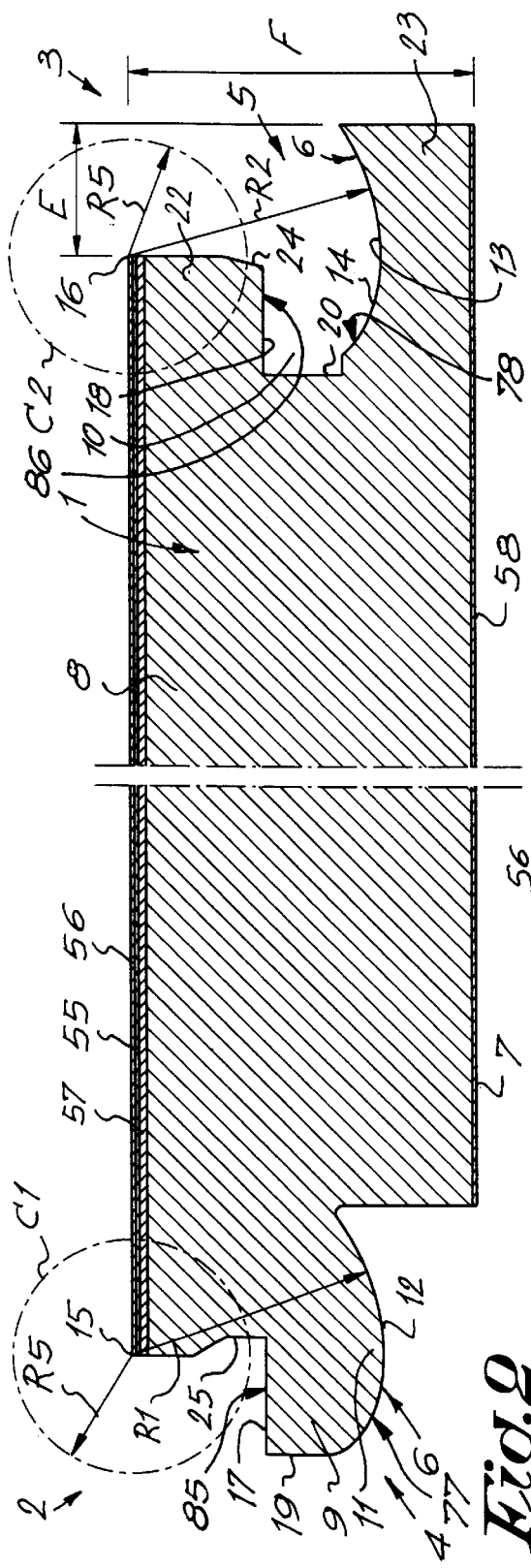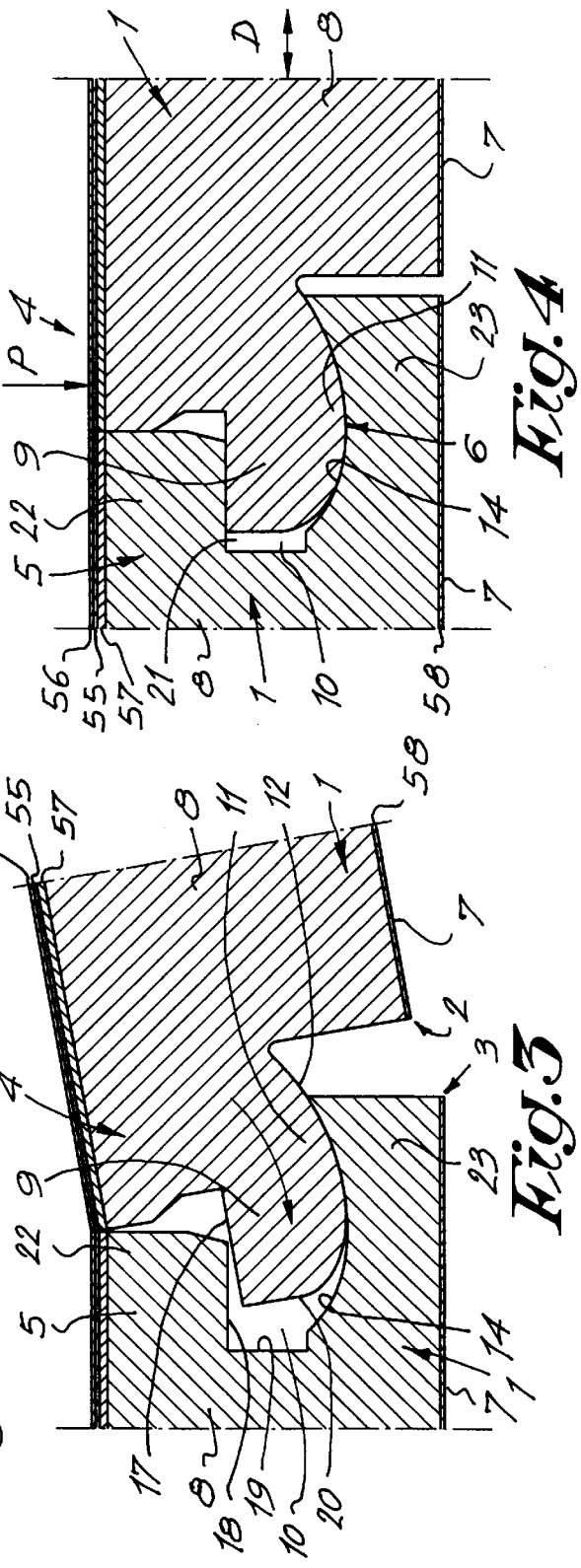

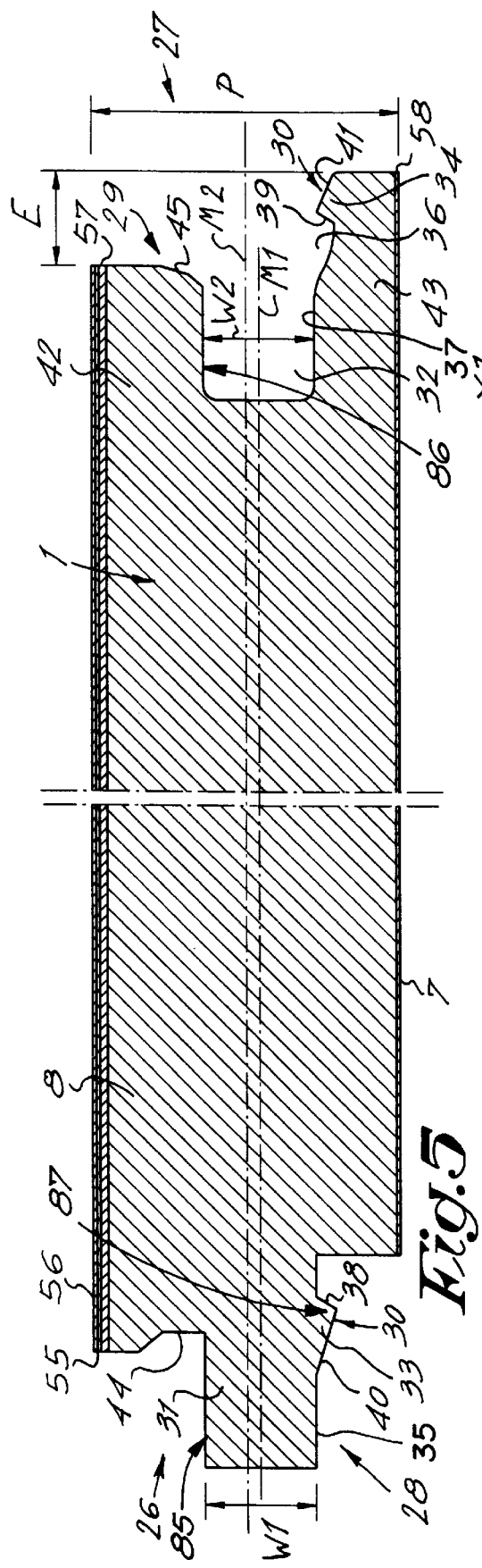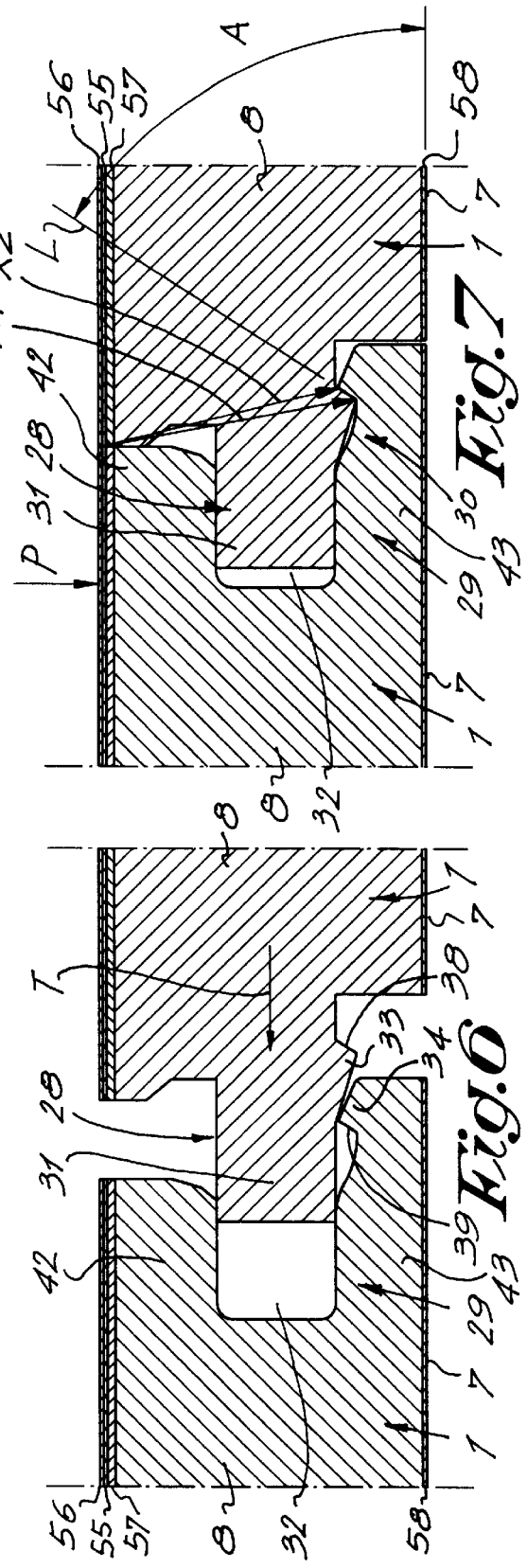

FLOOR PANEL WITH EDGE CONNECTORS

BACKGROUND OF THE INVENTION

1. Field of the Invention

This invention relates to a floor covering, made of hard floor panels.

2. Related Technology

In the first instance, the invention is intended for so-called laminated floors, but generally it can also be applied for other kinds of floor covering, consisting of hard floor panels, such as veneer parquet, prefabricated parquet, or other floor panels which can be compared to laminated flooring.

It is known that such floor panels can be applied in various ways.

According to a first possibility, the floor panels are attached at the underlying floor, either by glueing or by nailing them on. This technique has a disadvantage that is rather complicated and that subsequent changes can only be made by breaking out the floor panels.

According to a second possibility, the floor panels are installed loosely onto the subflooring, whereby the floor panels mutually match into each other by means of a tongue and groove coupling, whereby mostly they are glued together in the tongue and groove, too. The floor obtained in this manner, also called a floating parquet flooring, has as an advantage that it is easy to install and that the complete floor surface can move which often is convenient in order to receive possible expansion and shrinkage phenomena.

A disadvantage with a floor covering of the above-mentioned type, above all, if the floor panels are installed loosely onto the subflooring, consists in that during the expansion of the floor and its subsequent shrinkage, the floor panels themselves can drift apart, as a result of which undesired gaps can be formed, for example, if the glue connection breaks.

In order to remedy this disadvantage, techniques have already been through of whereby connection elements made of metal are provided between the single floor panels in order to keep them together. Such connection elements, however, are rather expensive to make and, furthermore, their provision or the installation thereof is a time-consuming occupation.

Examples of embodiments which apply such metal connection elements are described, among others, in the documents WO 94/26999 and WO 93/13280.

Furthermore, couplings are known which allow coupling parts to snap fit into each other, e.g., from the documents WO 94/1628, WO 96/27719 and WO 96/27721. The snapping-together effect obtained with these forms of embodiment, however, does not guarantee a 100-percent optimum counteraction against the development of gaps between the floor panels, more particularly, because in fact well-defined plays have to be provided in order to be sure that the snapping-together is possible.

From GB 424.057, a coupling for parquetry parts is known which, in consideration of the nature of the coupling, only is appropriate for massive wooden parquetry.

Furthermore, there are also couplings for panels known from the documents GB 2.117.813, GB 2,256.023 and DE 3.544.845. These couplings, however, are not appropriate for connecting floor panels.

BRIEF SUMMARY OF THE INVENTION

The invention aims at an improved floor covering of the aforementioned type, the floor panels of which can be coupled to each other in an optimum manner and/or the floor panels of which can be manufactured in a smooth manner, and whereby preferably one or more of the aforementioned disadvantages are excluded.

The invention also aims at a floor covering which has the advantage that no mistakes during installing, such as gaps and such, can be created.

Furthermore, the invention also aims at a floor covering whereby the subsequent development of gaps is excluded or at least counteracted in an optimum manner, whereby also the possibility of the penetration of dirt and humidity is minimalized.

To this aim, the invention relates to a floor covering, consisting of hard floor panels which, at least at the edges of the two opposite sides, are provided with coupling parts, cooperating which each other, substantially in the form of a tongue and a groove, wherein the coupling parts are provided with integrated mechanical locking elements which prevent the drifting apart of two coupled floor panels into a direction perpendicular to the related edges and parallel to the underside of the coupled floor panels. Hereby, these coupling parts are optimalized in such a manner that they allow that any form of play is counteracted and preferably is excluded.

By integrated mechanical locking elements is understood that these form a fixed part of the floor panels, either by being connected in a fixed manner to the floor panels, or by being formed in one piece therewith.

In a first important preferred form of embodiment, the coupling parts are provided with locking elements which, in the engaged position of two or more of such floor panels, exert a tension force upon each other which force the floor panels towards each other. As a result of this that not only the formation of gaps counteracted during installation, but also in a later stage the development of gaps, from any causes whatsoever, is counteracted.

According to another characteristic of the intention, the coupling parts, hereby are formed in one piece with the core of the floor panels.

According to a second important preferred embodiment, the aforementioned optimalization is achieved in that the floor covering panel possesses the following combination of characteristics: the coupling parts and locking elements are formed in one piece with the core of the floor panels; the coupling parts have such a shape that two subsequent floor panels can be engaged into each other exclusively by snapping together and/or turning, whereby each subsequent floor panel can be inserted laterally into the previous; the coupling parts are interlocked free from pay in all directions in a plane extending perpendicular to the aforementioned edges; the possible difference between the upper and lower lip of the lips which border the aforementioned grooves, measured in the plane of the floor panel and perpendicular to the longitudinal direction of the groove, is smaller than one time the total of the thickness of the panel; the total thickness of each related floor panel is larger than or equal to 5 mm; and that the basic material of the floor panels, of which the aforementioned core and locking means are formed, consists of a ground product which, by means of a binding agent or by means of melting together, is made into a unitary composite, and/or of a product on the basis of synthetic material and/or of a chip board with fine chips.

Due to the fact that the coupling parts provide for an interlocking free from play, as well as due to the fact that these coupling parts are manufactured in one piece, from the basic material of the floor panels, a perfect connection between adjacent floor panels can always be guaranteed, even with repeated expansion and shrinkage of the floor surface.

This combination of characteristics can be combined or not with the aforementioned characteristic that the locking means exert a tension force upon each other when panels are joined together.

According to a third important preferred embodiment, the characteristics of which may or may not be combined with the characteristics of the embodiments described above, the floor covering is characterized in that the lower lip which limits or defines the lower side of the groove, extends beyond the upper lip in the plane of the panel; the locking elements are formed at least of a contact portion which inwardly slopes downward; and that this portion, at least partially, is located in the portion of the lower lip which extends beyond the upper lip. The advantages of these features will appear from the further description.

According to a preferred form of embodiment, the floor panels are configured as elongated panels and the coupling parts described above are applied along the longitudinal sides of these panels.

According to a particular form of embodiment, coupling parts are provided at the other two sides, too, either of another construction than described above or not.

In the most preferred form of embodiment, for the basic material use shall be made of the aforementioned product, which, as said, is ground and, by means of a binding agent, made into a unitary composite material. More particularly, for the core use shall be made of finely-ground wood which preferably is glued, more particularly, moisture resistant glued. Still more particularly, for the core use shall be made of so-called HDF board (High Density Fibreboard) or MDF board (Medium Density Fibreboard) which is highly compressed ground wood particles and binder material. Hereinafter, the wood component of the core material shall be referred to as "wood product".

The fact that the invention is applied to floor panels the basic material of which consists of the material described above, offers the advantage that with the processing of this material, very smooth surfaces are obtained whereby very precise couplings can be realized, which, in first instance, is important in the case of a snap-together connection and/or turning connection free from play. Also, very special forms of coupling parts can be manufactured in a very simple manner because the aforementioned kinds of material can be processed particularly easy.

The surfaces obtained with HDF and MDF also have the advantage that the floor panels mutually can be shifted readily alongside each other in interlocked condition, even when engaged with a tensioning force.

The applicants also discovered that the aforementioned materials, in particular HDF and MDF, show ideal features in order to realize a connection, such as mentioned above, as these material show the right features in respect to elastic deformation in order to, on the one hand, realize a snap-together effect, and, on the other hand, receive expansion and shrinkage forces in an elastic manner, whereby it is avoided that the floor panels come unlocked or are damaged in an irreparable manner.

In the case that for the core use is made of a material based on synthetic material, to this end solid synthetic material can be used as well as a mixture of synthetic materials, eventually composed of recycled materials.

The floor covering preferably is formed by joining the floor panels into each other free of glue. Hereby, the connections are of such nature that the floor panels can be disassembled without being damaged, such that, for example, when moving from one residence or location to another, they can be taken along in order to be placed down again. It is, however, clear that a glueing between tongue and groove is not excluded.

The invention, of course, also relates to floor panels which allow the realization of the aforementioned floor covering.

The invention also relates to a method for the manufacturing of the aforementioned floor panels with which the advantage that the tongues and/or grooves, including the corresponding locking means, can be provided at the floor panels at high production speeds without problems. More particularly, it aims at a method which allows that the rather complicated forms of the tongue and the groove of the aforementioned floor panels can be formed completely by means of milling cutters, the diameter of which can be chosen independent of the form to be realized, such that the use of small milling cutters, for example finger cutters, with diameters smaller than the depth of the tongue or groove can be excluded.

In accordance with this method the tongue and/or groove is formed by means of a milling process using at least two sequential milling cycles or passes by means of milling cutters which are positioned at different angles in respect to the related floor panel. During each of the aforementioned milling cycles, preferably substantially the final form of one flank, either of the tongue or of the groove, is formed.

For the aforementioned two milling cycles, thus, milling cutters are used which extend outside the groove, respectively the tongue. More particularly the diameters of these milling cutters shall at least be 5 times and even better 20 times larger than the thickness of the floor panels.

The use of milling cutters having the aforementioned diameters has as an advantage that the normal production speeds can be maintained which are also applied during milling of a classical straight tongue and groove. There is also the advantage obtained that the installation of such milling cutters induce only minor or no additional costs because such milling cutters can be placed directly upon a motor shaft and/or the conventional machines can be used.

BRIEF DESCRIPTION OF THE DRAWINGS

With the intention of better showing the characteristics according to the invention, in the following, as an example without any limitative character, several preferred forms of embodiment are described, with reference to the accompanying drawings, wherein:

FIG. 1 represents a floor panel of a floor covering according to the invention;

FIG. 2, on a larger scale, represents a cross-section according to line II—II in FIG. 1;

FIGS. 3 and 4 represent how two floor panels with coupling parts according to FIG. 2 match into each other;

FIG. 5, on a larger scale, represents a cross-section according to line V—V in FIG. 1;

FIGS. 6 and 7 represent how two floor panels with coupling parts according to FIG. 5 match into each other;

FIGS. 8 to 11 represent a number of variants of coupling parts of floor panels according to the invention;

DETAILED DESCRIPTION

Figure 9:
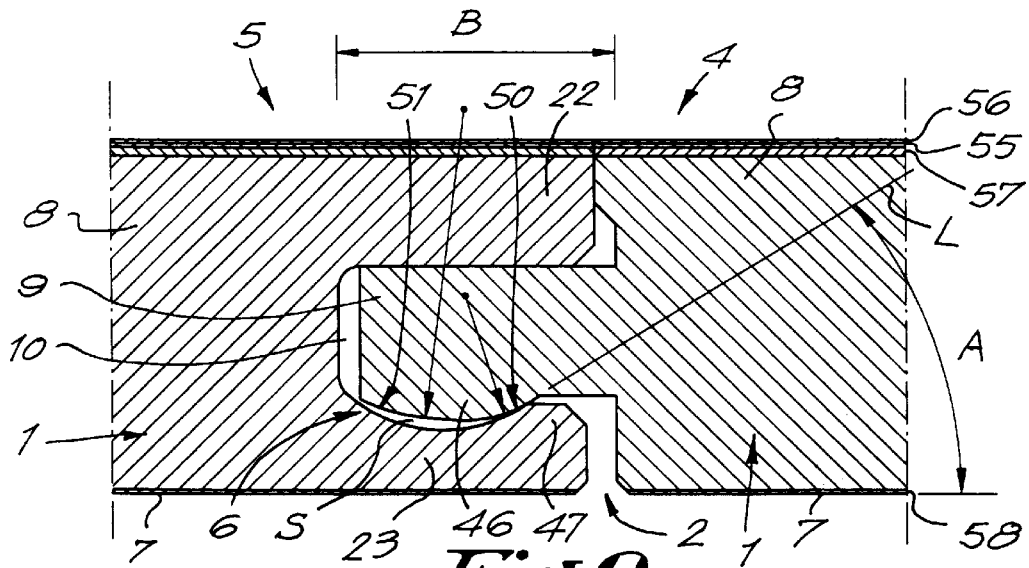

The invention relates to a floor covering which is composed of hard floor panels 1, for example, such as a laminated panel as shown in FIG. 1.

These floor panels 1 can be of various shape, for example, rectangular or square, or of any other shape.

In the most preferred form of embodiment, they shall be manufactured in an elongated form, such as shown in FIG. 1, for example, with a length of 1 to 2 meters. The thickness, however, can also vary, but is preferably 0.5 to 1.5 cm, and more particularly 0.8 cm.

Each floor panel 1 is, at least at the edges of two opposite sides 2-3, provided with coupling parts 4-5 which permit two adjacent identical floor panels 1 to be coupled to each other.

According to the invention, the coupling parts 4-5, as represented in the FIGS. 2 to 4, are provided with integrated mechanical locking parts or elements 6 which prevent the drifting or sliding apart of two coupled floor panels 1 in a direction D perpendicular to the respective sides 2-3 and parallel to the underside 7 of the coupled floor panels 1; the coupling parts 4-5 and the locking elements 6 are formed in one piece with the core 8 of the floor panels 1; the coupling parts 4-5 have such a shape that two subsequent floor panels 1 can be engaged into each other solely by snapping-together and/or turning after the coupling parts are partially engaged, whereby each subsequent floor panel 1 can be laterally inserted into the previous; and the coupling parts 4-5 preferably are interlocked free from play in all directions in a plane which is located perpendicular to the aforementioned edges.

In the case of floor panels 1 with an elongated shape, as represented in FIG. 1, the respective coupling parts 4-5 are located at the longitudinal sides 2-3.

The coupling parts 4-5 can be realized in various forms, although the basic forms thereof will always be formed by a tongue 9 and a groove 10.

In the form of embodiment of FIGS. 2 to 4, the related floor panel 1 is provided with coupling parts 4-5 and locking means 6 which allow to two floor panels 1 to be mutually engaged by means of a turning movement, without the occurrence of any snap-together effect.

In the represented example, the locking elements 9 consist of a first locking element 11, formed by a protrusion with a bent round shape at the lower side 12 of the tongue 9, and a second locking element 13, formed by a recess with a bent hollow or downwardly concave shape in the lower wall 14 of the groove 10.

The locking elements 11-13 ensure that two floor panels 1 which are coupled to each other can not move laterally in the horizontal plane with respect to each other.

In order to enable two floor panels 1 to be inserted into each other by means of a turning movement, the curvatures preferably are circular. The bottom side 12 of locking means 6 has a curvature with a radius R1, the center of which coincides with the respective upper edge 15 of the floor panel 1, whereas the lower wall 14 of the locking part 5 has a curvature with a radius R2 which is equal to the radius R1, but its center coincides with the respective upper edge 16. Radii R1 and R2 may also be applied which are larger or smaller than the distance to the upper edge 15, 16 respectively, and/or which differ from each other in size.

The upper side 17 of the tongue 9 and the upper wall or side 18 of the groove 10 are preferably flat and preferably are located in the horizontal plane.

The front or inner end or sides 19 and 20 of the tongue 9 and the groove 10 of the two interlocked floor panels 1 preferably do not fit closely against each other, such that an intermediate space 12 is created between them into which possible dust remainders or such can be pushed away by means of the tongue 9.

The tongue 9 and the groove 10 preferably have shapes which are complementary to each other, such that the tongue 9 in the engaged condition of two identical floor panels 1 precisely sits against the upper wall 18 and the lower wall 14 of the groove 10, whereby a pressure P, exerted against the upper lip 22, is received or reacted not only by this lip 22, but by the complete structure, because this pressure can be transmitted through the tongue 9 and the lower lip 23 to cause the panels to be urged towards each other.

It is, however, clear that a number of minor deviations to these complementary forms can occur which, anyhow, have no or almost no effect upon the receipt and transmission of pressure forces. For example, a chamfer 24 and lip 22 and a recess 25 can be provided, as represented in FIGS. 2 to 4, as a result of which the subsequent floor panels 1 can easily be pushed and guided into each other, such that no possible ridges in the subflooring or such render good insertion difficult.

As represented in the FIGS. 5 to 7, the floor panels 1 according to the invention can also, along the sides 26-27 which are at a right angle to the sides 2-3, be provided with coupling parts 28-29 which have locking means 30, too. The coupling parts 28-29 are preferably also realized in the shape of a tongue 21 and a groove 32. Hereby, the locking elements 30 do not have to be of the same nature as the locking elements 6.

Preferably, at the sides 26-27 locking elements are provided which allow for an engagement and interlocking by means of a lateral translation movement in direction T only, as represented in FIGS. 6 and 7. To this aim, the locking means 30 consist of a snap-together connection with locking elements 33 and 34 which grip behind each other.

As represented in FIGS. 5 to 7, the locking element 33 preferably consists of a protrusion of the lower side 35 of the tongue 31 which can be located in a recess 36 in a lower lip 43 extending distally from the lower wall 37 of the groove 32. The locking element 34 is formed by the upward directed part or protrusion which defines the distally outer end of recess 36.

In this case, the locking elements 33-34 have contact surfaces 38-39 which are parallel to each other and preferably extend in an inclined manner, according to a direction which simplifies the snapping-together of the panels. The common plane of tangency L which is determined by the common tangent at the meeting point or area of surfaces 38-39, hereby forms an angle A sloping inwardly and downwardly from an outer region to an inner region relative to the underside 7, which angle is smaller than 90°.

The locking elements 33-34 preferably are provided with inclined portions 40 and 41 which, when two floor panels 1 are engaged, cooperate with each other in such a manner that the locking elements 33-34 can easily be pushed over each other until they grip behind each other by means of a snap-together effect (FIGS. 6 and 7).

The thickness W1 of the tongue 31 preferably is equal to the width W2 of the groove 32, such that compression pressure P applied to the upper lip 42 is reacted by the tongue 31 which, in its turn, then is reacted by the lower lip 43.

Analogous to the chamfer 24 and recess 25, a recess 44 and a chamfer 45 are provided also at the edges 28-29.

It is noted that such a snap-together coupling can also be applied at the edges 2-3. Hereby, this can be a snap-together coupling analogous to these of FIGS. 5 to 7, but this can also be a snap-together coupling using other forms of coupling configurations, for example, such as represented in FIGS. 8 and 9. Contrary to the locking elements 33-34 which consist of rather local protrusions, in the forms of embodiment of FIGS. 8 and 9 use is made of locking elements 46-47 which, in comparison to the total width B of the coupling, extend over a rather large distance.

In this case, the locking elements 46-47 are also provided at the lower side 12 of the tongue 9 and the lower wall 14 of the groove 10.

According to FIG. 8, the locking elements 46-47 have contact surfaces 48-49 which are at an angle with the plane of the floor panel 1. In this manner, a coupling is obtained which is interlocked in a particularly fixed manner.

As represented in FIG. 9, the locking elements 46-47 possibly can be configured in such a manner that substantially only a linear contact is obtained, for example, because the contact surfaces directed towards each other are formed with different curvatures.

The surfaces, directed towards each other, of the locking elements 46-47 hereby consist of curved surfaces. The common plane of tangency L forms an angle A which is smaller than 90°, and more preferably is smaller than 70°.

In this manner, the locking element 46 preferably has two portions with a different curvature, on one hand, a portion 50 with a strong curvature and, on the other hand, a portion 51 with a weak curvature. The portion 50 with the strong curvature provides for the formation of a firm coupling. The portion 51 with the weak curvature facilitates the coupling parts 4-5 to be brought into each other easily. The intermediate space S forms a chamber which offers space for dust and the like which, when engaging two floor panes 1, inevitably infiltrates there.

In the case of a snap-together connection, for example, a connection such as represented in FIGS. 7 to 9, preferably the tongue 9-31 has a shape that thickens from below, which then can cooperate with a widened portion in the groove 10.

Figure 10:
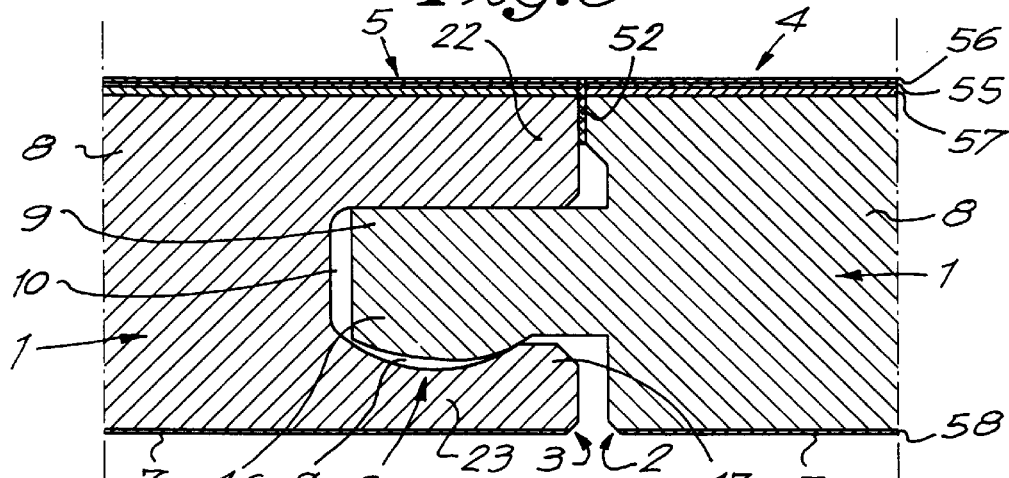

In FIG. 10, a variant is represented whereby at least at the level of the upper edges 15-16, a sealing material 52 is provided, as a result of which a watertight sealing can be assured. This sealing material 52 may consist of a strip or covering which is provided previously at the floor panel 1, either at one or both upperside edges 15-16.

Figure 11:
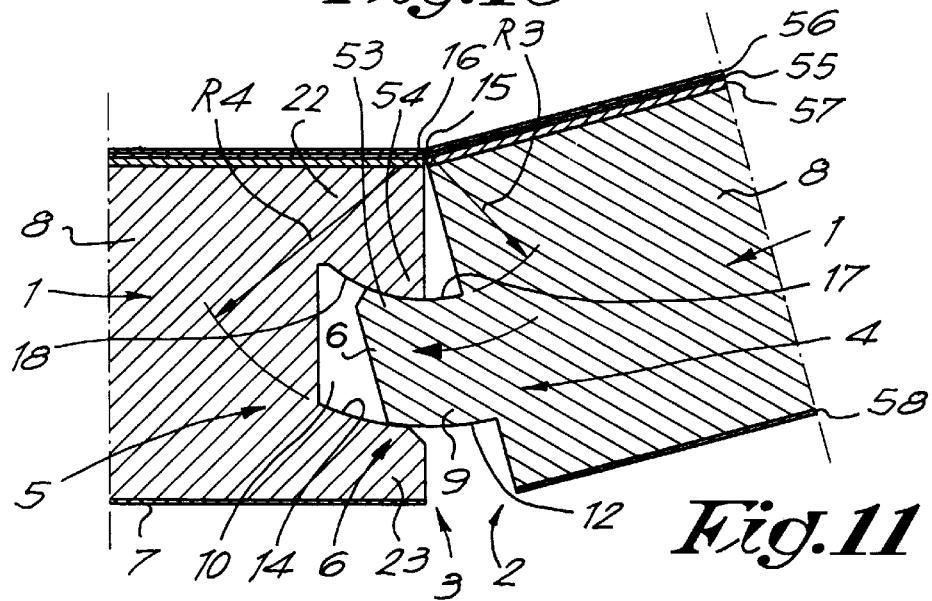

In FIG. 11, a further variant is represented, whereby the locking element 6 is formed by an upward directed portion 53 at the tongue 9, which as a result of a turning movement of the panel, is brought behind a downward-directed portion 54 on the upper wall 18. More particularly, this is obtained by forming the upper side 17 and the upper wall 18 with a curvature R3, the center of which is situated at the upperside edges 15-16, and forming the lower side 12 and the lower wall 14 with a radius R4, the center of which is also situated at the upperside edges 15 and 16, respectively. These radii R3-R4 can be chosen otherwise, too.

In general, according to the invention, the difference between, on one hand, the radius R1, R3 respectively, and, on the other hand, the radius R2, R4 respectively, preferably should not be larger than 2 mm.

It is also preferred that the center of these radii be situated inside the circle C1, C2 (see FIG. 2) respectively, which extends with a radius R5 of 3 mm centered at upperside edge 15, 16 respectively.

Finally is noted that, according to the invention, the lower lip 23-43, as represented in FIGS. 2 to 7, can be formed distally longer than the upper lip 22-42. This has an advantage that the coupling parts 4-5-28-29 can be shaped in an easier manner by means of a milling cutter or the like. Furthermore, this simplifies the engagement of two floor panels 1, because each subsequent floor panel 1 during installation can be placed upon the protruding lower lip 23-43, as a result of which the tongue 9-31 and the groove 10-32 automatically are positioned in front of each other.

The embodiments wherein the lower lip 23 is equal to or distally shorter than the upper lip 22, in their turn, offer the advantage that no protruding lip 23 remains at the extreme edge of the floor which might cause problems in finishing the floor installation.

In order to allow for a smooth assembly, to guarantee the necessary stability and firmness and in order to limit the quantity of material to be cut away, the difference E between the distally outer edge of the upper lip 22-42 and the distally outer edge of the lower lip 23-43, measured in the plane of the floor panel and perpendicular to the longitudinal direction of the groove 10, should preferably be kept smaller than one time the total thickness F of the floor panel 1. For stabilitiy's sake, normally this total thickness F shall never be less than 5 mm.

The small dimension of the difference E offers the advantage that the lower lip need not be strengthened by a reinforcement strip or the like.

According to a particular form of embodiment, the central line M1 through the tongue 9 and the groove 10 is situated lower than the center M2 of the floor panel 1, such, that the upper lip 22-42 is thicker than the lower lip 23-43. In first instance, this is essential in this kind of connection, because then it is the lower lip 23-43 which bends, whereby the upper side of the floor panel 1 is kept free of possible deformations.

As explained in the introduction, for the core 8 a material is chosen from the following series:

a ground product which, by means of a binding agent or by means of melting together is made into a unitary composite material;

a product based on synthetic material;

chip board with fine chips.

The invention shows its usefulness, in first instance, preferably with laminated flooring, due to the reasons explained in the introduction.

As represented in the examples of the FIGS. 2 to 11, such laminated flooring preferably consists of a core 8 made of MDF medium density fiberboard board, HDF high density fiberboard board or similar, whereby at least at the upper side of this core 8 one or more layers of material are provided.

More particularly, it is preferred that the laminated flooring is provided with a decorative layer 55 and a protective top layer 56. The decorative layer 55 is a layer, impregnated with resin, for example, made of paper, which can be imprinted with a variety of patterns, such as a wood pattern, a pattern in the form of stone, cork, or similar or even with a fancy pattern. The protective top layer 56 preferably also consists of a layer saturated with resin, for example, melamine resin, which in the final product is transparent.

It is clear that still other layers can be applied, such as an intermediate layer 57 upon which the decorative layer 55 is provided.

Preferably, also a backing layer 58 shall be applied at the underside 7, forming a counterbalancing element for the top layers and, thus, guaranteeing the stability of the form of the floor panel 1. This backing layer 58 may consist of a material, for example paper, impregnated with a resin, for example, a melamine resin.

Figure 12:
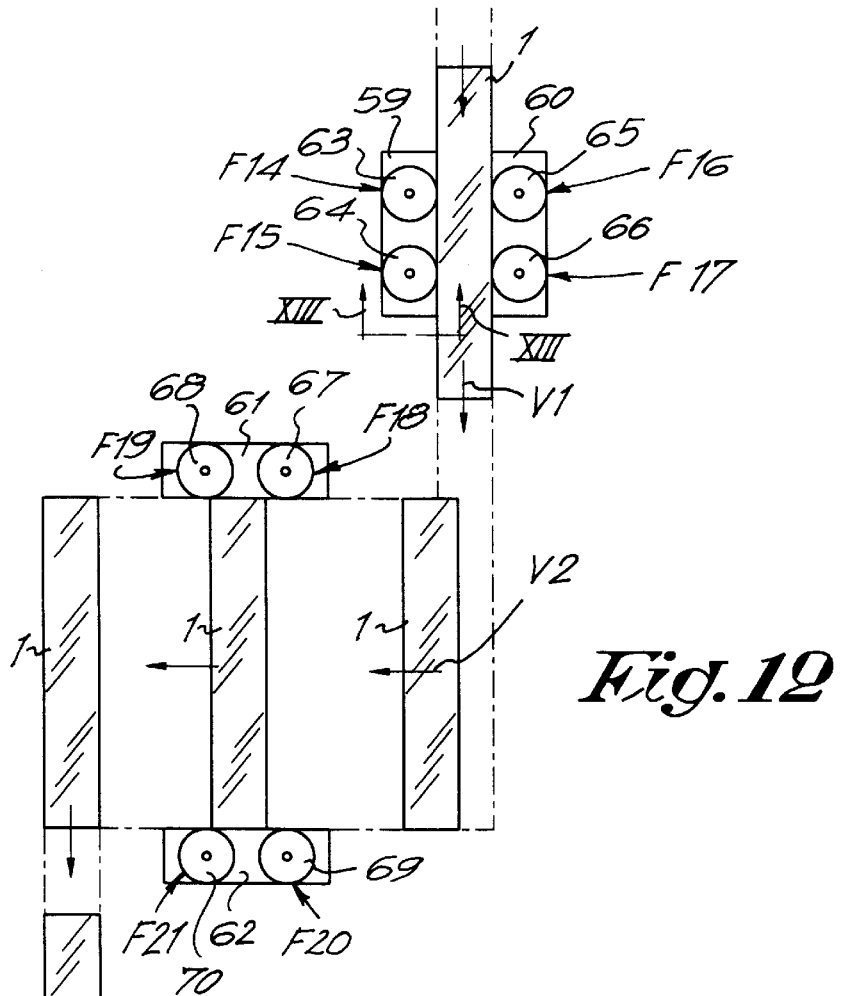
FIG. 12 schematically represents how the floor parts can be provided with coupling parts.

As represented schematically in FIG. 12, the tongue 9 and the groove 10, and preferably also the tongue 31 and the groove 32 are formed by means of a milling process. In the case that a profile has to be applied on all four sides, the floor panels 1 preferably shall be displaced by means of two sequential perpendicular movements V1 and V2, whereby during the first movement profiles at two opposite edges are provided, in this case the longitudinal edges, by means of milling devices 59-60, whereas during the second movement profiles are provided at the other edges, in this case the small edges, by means of milling devices 61-62. During these processing, the floor panels 1 preferably are put with their decorative layer directed downward.

According to an important characteristic of the invention, each respective tongue 9-31 and groove 10-32 are formed by means of a milling process with at least two sequential milling cycles or passes by means of milling cutters which are positioned at different angles in reference to the related floor panel 1.

Figure 13:
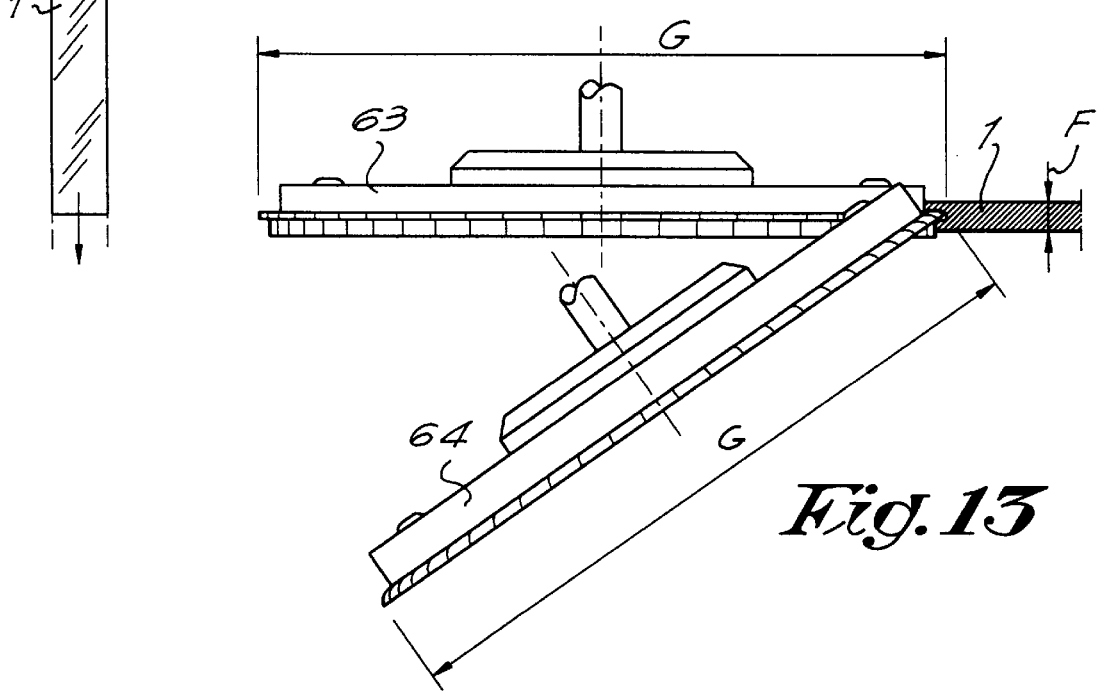
FIG. 13 represents a cross-section according to line XIII—XIII in FIG. 12.
Figure 14:
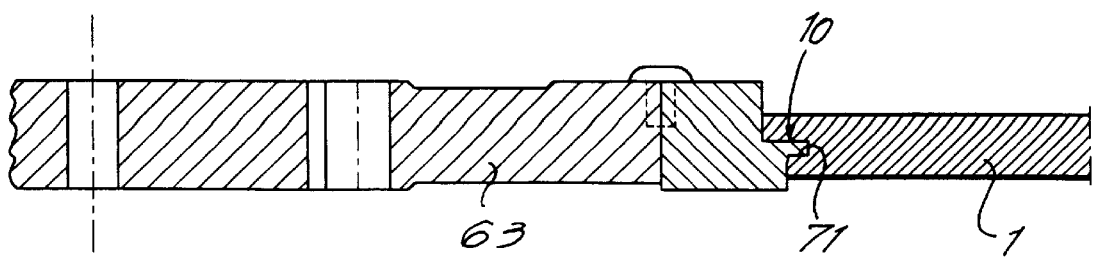
FIGS. 14 to 21, on a larger scale and in cross-section, represent the penetration of the milling cutters which are indicated in FIG. 12 with arrows F14 to F21.
Figure 15:
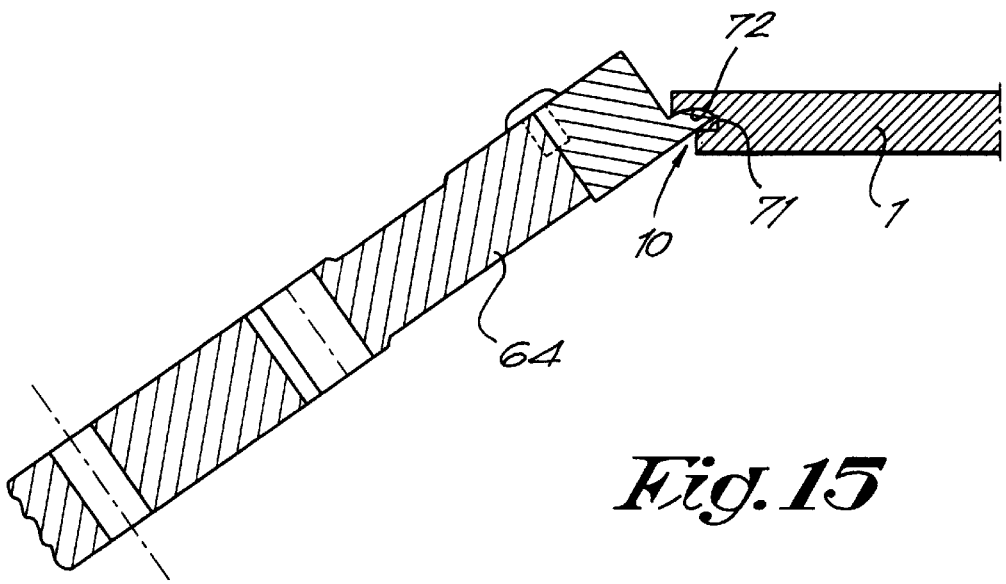
Figure 16:
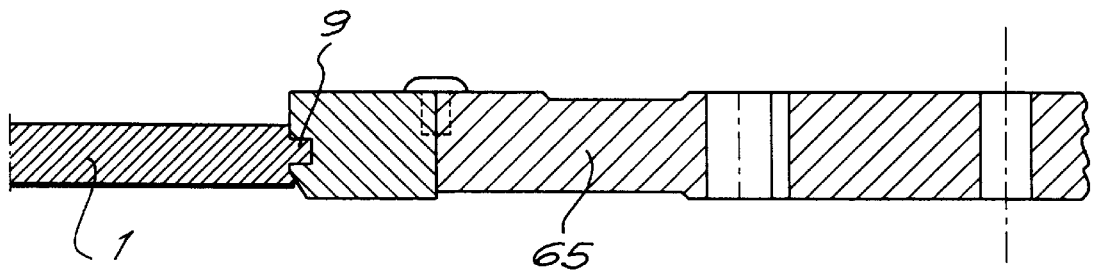
Figure 17:
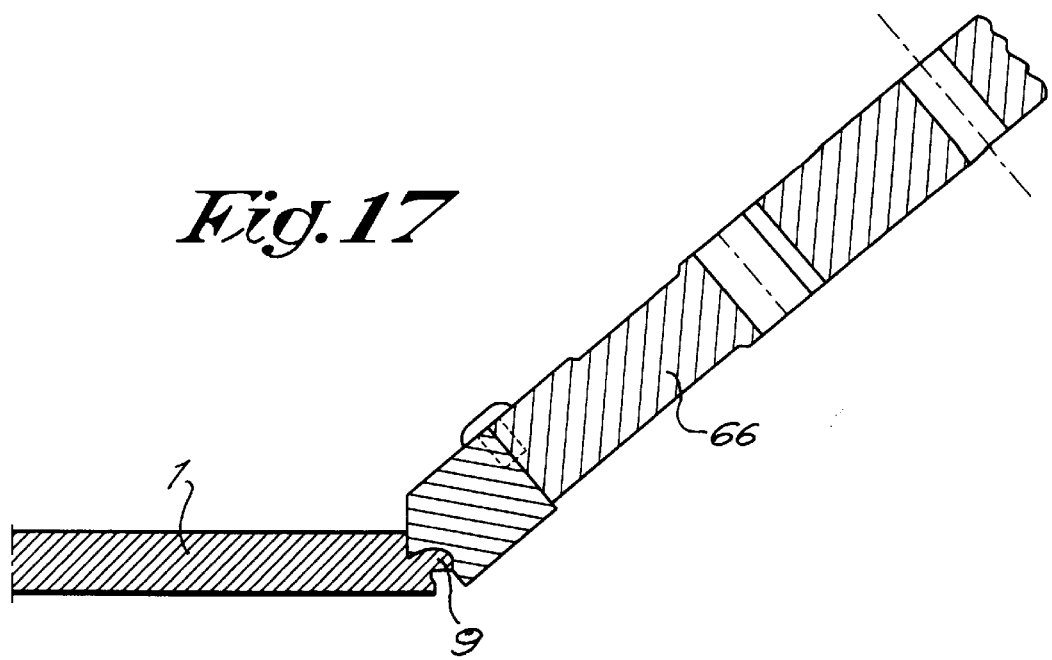
Figure 18:
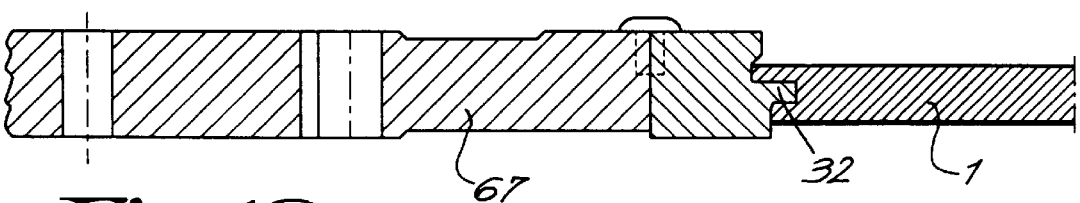
Figure 19:
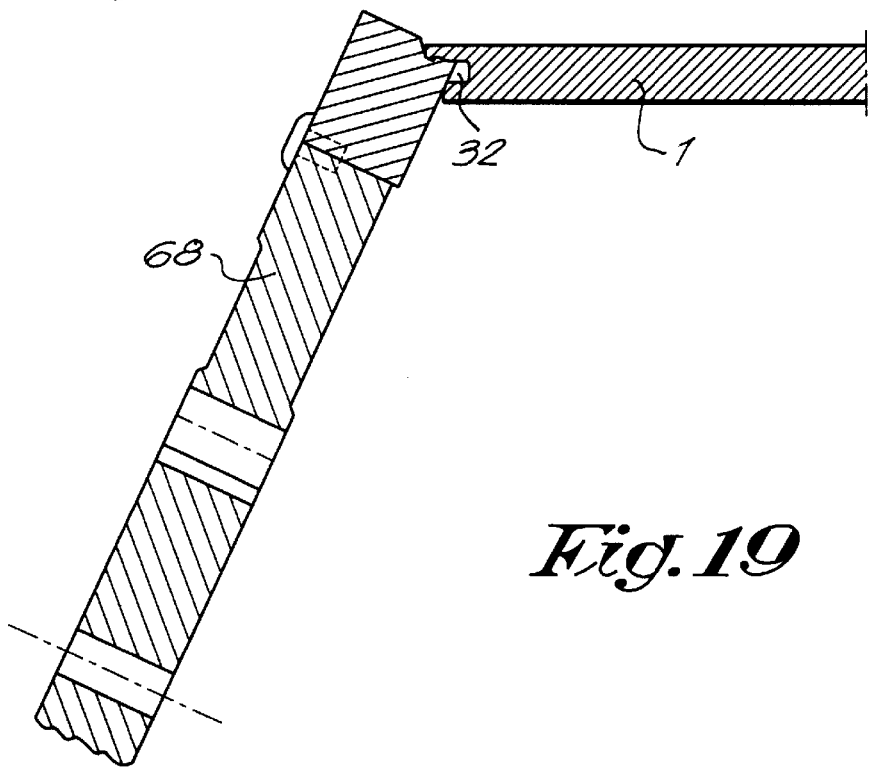
Figure 20:
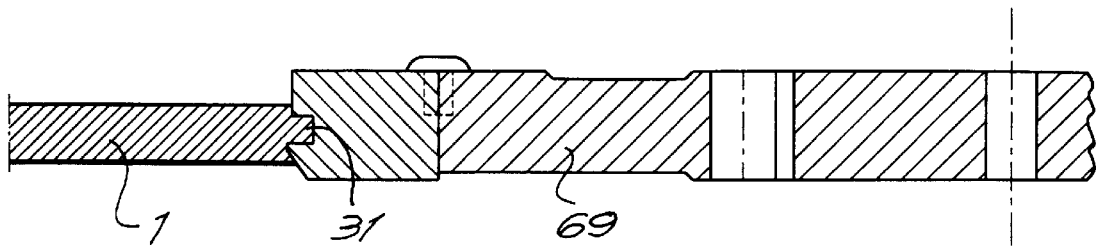
Figure 21:
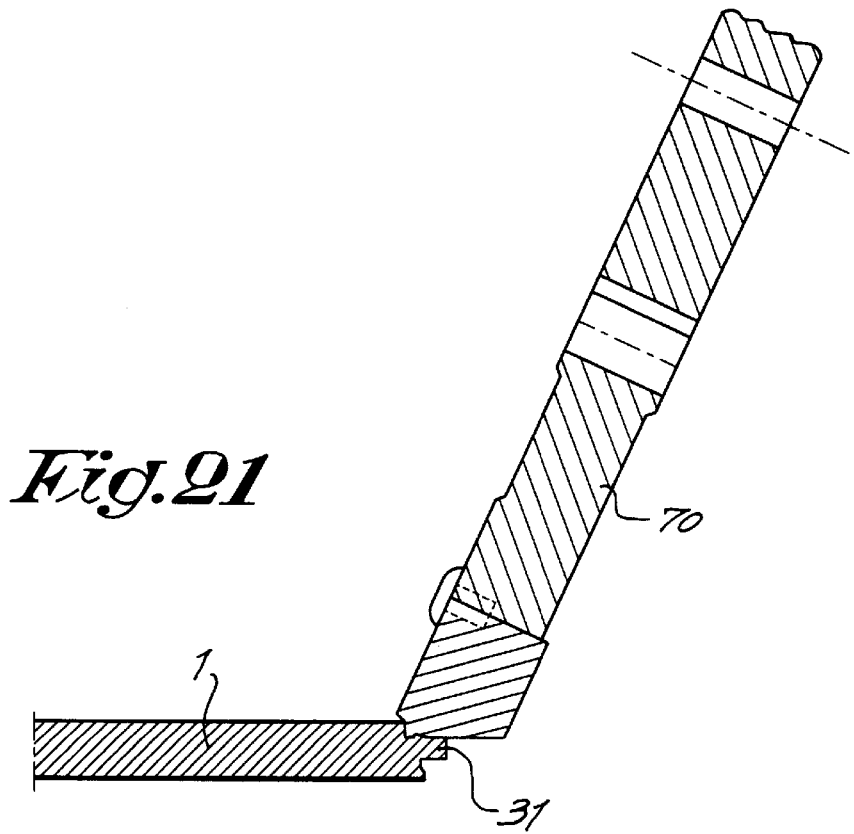

This is illustrated in FIGS. 13, 14 and 15, wherein it is represented how a groove 10 is realized by means of two milling cycles by means of two milling cutters 63 and 64. FIGS. 16 and 17 represent how the tongue 9 is shaped by means of milling cutters 65 and 66.

The FIGS. 18–19 and 20–21 represent similar views showing how the groove 32 and the tongue 31 are shaped by means of milling cutters 67-68 and 69-70, positioned at an angle.

During each of the aforementioned milling passes, substantially the final shape of one flank is fully realized. For example, the milling cutter 63 of FIG. 14 determines the final shape of the lower flank 71 of the groove 10, whereas the milling cutter 64 determines the final shape of the upper flank 72.

As mentioned in the introduction, preferably milling cutters 63 to 72 shall be used, having diameters G which are at least 5 times, and even better at least 20 times larger than the thickness F of the floor panels 1.

Apart of the mentioned milling cutters, preferably still other milling cutters are applied, for example, in order to remove a part of the material to be removed during a first premachining cycle.

In the FIGS. 22 to 25, a particularly preferred form of embodiment of a floor panel 1 according to the invention is represented. Hereby, the parts which correspond with the previous embodiments are indicated with corresponding references.

An important characteristic herein consists in that the coupling parts 4-5 are provided with locking elements 6 which, in engaged condition with the panels in a common plane, exert a tension force upon each other, as a result of which the engaged floor portions 1 are forced towards each other in compression. As represented, this is realized preferably by providing the coupling parts with an elastically yieldable or bendable portion, in this case the lower lip 43, which, in engaged condition, is at least partially bent and in this way creates a tension force which results in the engaged floor panels 1 being forced towards each other. The resultant bending V, as well as the tension force K, are indicated in the enlargement view of FIG. 23.

In order to obtain the tension force K pressing together the engaged floor panels 1, the bendable portion, in this case the lip 43, preferably is provided, as represented, with an inwardly and downwardly inclined contact surface 73 which preferably can cooperate with a corresponding contact surface 74 on tongue 9. These contact surfaces 73-74 are similar to the aforementioned contact surfaces 39-38 and also similar to the inclined portions of the lower lip of FIGS. 2 to 4.

Figure 23:
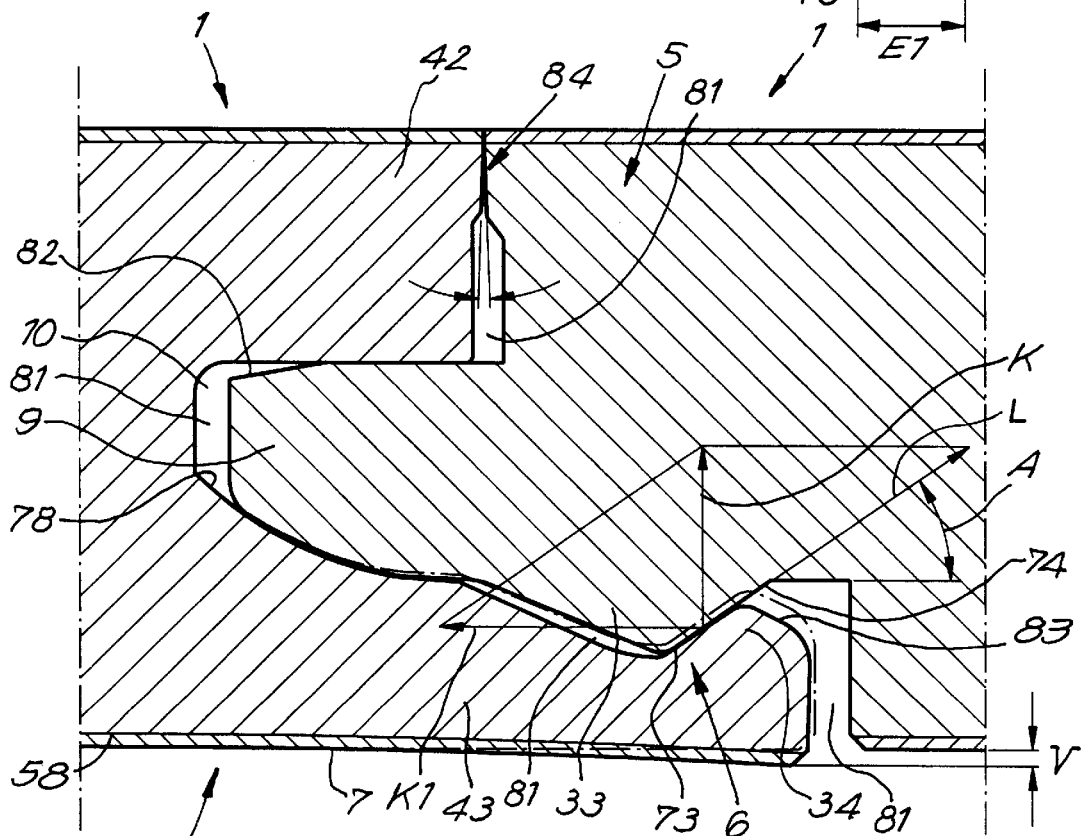
FIG. 23, on a larger scale, represents the coupling of two floor panels of FIG. 22.

In the FIGS. 2 and 5, the portions form complementary matching shapes; it is, however, clear that, by a modification, also a tension effect similar to that shown in FIG. 23 can be realized.

Due to, on one hand, the contact along the angle A, and, on the other hand, the fact that a tension force K is created, a compression force component K1 is produced, as a result of which the floor panels 1 are drawn against each other in compression.

Preferably, the angle A of the mutual plane of tangency of contact surfaces 73-74 relative to the horizontal plane is situated between 30 and 70 degrees. In the case that use is made of the embodiment whereby a tension force K is realized, an angle A of 30 to 70 degrees is ideal in order, on one hand, to effect an optimum pressing-together of the floor panels 1 and, on the other hand, to ensure that the floor panels 1 can easily be engaged and respectively disassembled.

Although the pressing force K1 preferably is delivered by the aforementioned lip 43, the invention does not exclude other forms of locking elements or structures whereby this force is delivered by other bendable portions.

It is noted that the bending V is relatively small, for example, several hundredths up to several tenths of a millimeter, and does not have an influence upon the placement of the floor covering. Furthermore is should be noted that such floor covering generally is placed upon and underplayed which is elastically compressible, as a result of which the bending V of the lip 43 only produces local bending of the underplayed.

Due to the fact that the lip 43 is bent apart and that it remains somewhat bent apart in engaged position, the additional advantage is obtained that, when exerting a pressure upon the floor covering, for example, when placing an object thereupon, the pressing-together compressive force is enhanced and, thus, the development of gaps is counteracted even more.

It is noted that the inventors have found that, contrary to all expectations, an ideal tension force can be realized by manufacturing the coupling parts 4-5, including the locking elements 33-345, and preferably the complete core 8, of HDF board or MDF board, although these material normally only allow a minor elastic deformation.

HDF and MDF also offer the advantage that smooth surfaces are obtained, as a result of which the locking elements can be moved easily over each other.

According to a variant of the invention, the tension force can also be supplied by means of an elastic compression of the material of the coupling parts themselves, to which end these coupling parts, and preferably the complete core 8, would be manufactured using an elastically compressible material.

Figure 24:
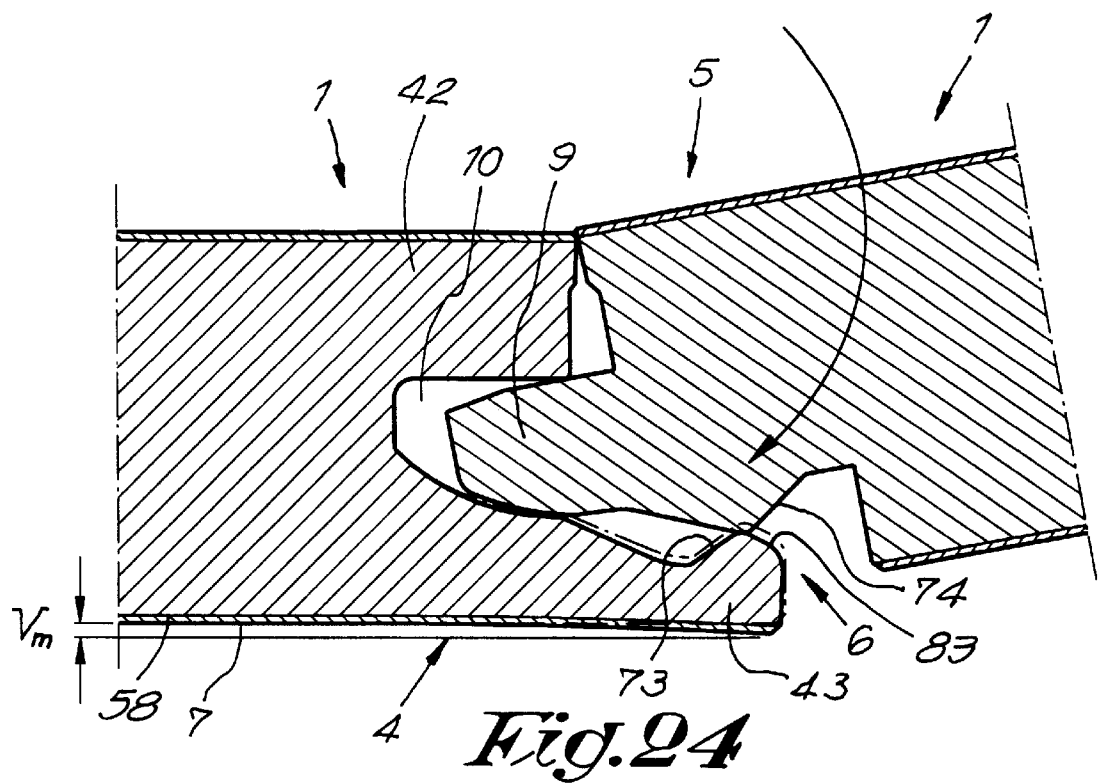
FIGS. 24 and 25 represent two manners of coupling floor panels according to FIG. 22 to each other.
Figure 25:
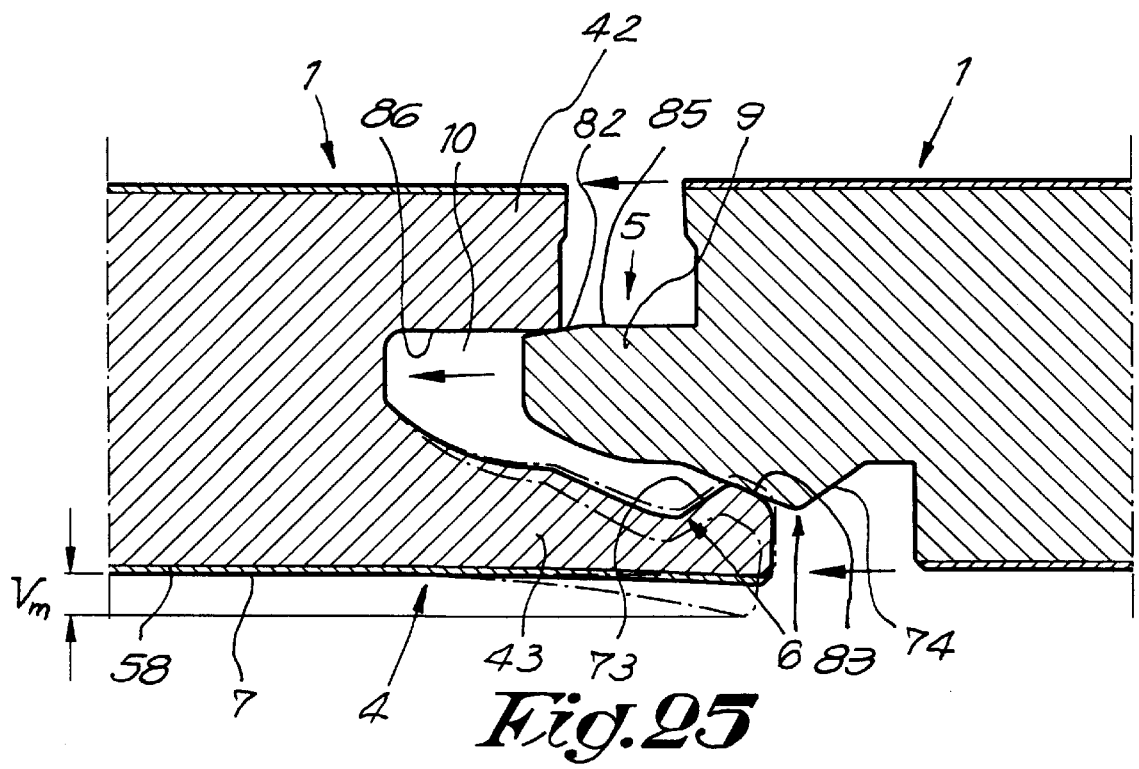

A further particular characteristic of the embodiment of FIGS. 22 to 25 consists in that the floor panels 1 can be selectively engaged by means of a turning movement, as represented in FIG. 24, as well as by means of laterally shifting them towards each other in substantially a common plane, as represented in FIG. 25, preferably in such a manner that, during the engagement by means of the turning movement with the coupling parts partially engaged, a maximum bending Vm results in the coupling parts, more particularly in the lip 43, which bending Vm is less pronounced, if not nonexistent, as in the FIGS. 2 to 4, in comparison to the bending Vm which results when the floor panels 1 are engaged by means of shifting them towards each other.

The advantage of this consists in that the floor panels 1 can be engaged easily by means of a turning movement, without necessitating use of a tool therefore, whereas it still remains possible to engage the floor panels also by means of shifting them laterally. This latter is useful, in first instance, when the last panel has to be placed partially under a door frame or similar situation. In this case, the floor panel 1 can be pushed under the door frame with the side which does not have to be engaged and subsequently, possibly by means of tools, can be snapped into the adjacent floor panel by lateral sliding together.

It is noted that the shapes of the coupling parts 4-5 shown in FIGS. 22 to 25 can also be used for the coupling parts 28-29 of the short sides of the panels.

According to the invention, in the case that the four sides 2-3-26-27 are provided with coupling pars 4-5-28-29, these coupling parts can be formed in such a manner that in one direction a firmer engagement than in the other direction is effected. In the case of elongated floor panels 1, for example, such as represented in FIG. 1, the locking at the small sides 26-27 preferably shall be more pronounced than at the longitudinal sides 2-3. The length of the patrs at the small sides, namely, is smaller and, in principle, less firm. This is compensated for by providing a more pronounced locking.

This difference in engagement can be obtained by shaping the contact surfaces 73-74 with different angles.

Preferably, the aforementioned protrusion, more particularly the locking element 33, is bounded by at least two portions 75-76, respectively a portion 75 with a strong (steep) inclination which provides for the locking, and a portion 76 with a weaker (less inclined) inclination which renders the engagement or guidance of the coupling parts easier. In the embodiment of FIGS. 22 to 25, these portions 75-76 are formed by straight planes, but, as already described with reference to FIG. 9, use can also be made of curved portions 50-51. In FIG. 5, these are the contact surface 38 and the inclined portion 40.

In the preferred form of the invention, the floor panels 1 comprise coupling parts 4-5 and/or 28-29 exhibiting one of the following or the combination of two or more of the following features:

a curvature 77 at the lower side of the tongue 9 and/or a curvature 78 at the lower lip 43 which form a guidance when turning two floor panels 1 into each other, with the advantage that the floor panels 1 can be engaged into each other easily during installation;

roundings 79-80 at the edges of the locking elements 33-34, with the advantages that the locking elements can easily shift over each other during their engagement, or during disassembly of the floor panels 1 and that the locking elements will not be damaged, for example, crumble away at their edges, even if the floor panels are engaged and disassembled;

dust chambers 81, or spaces 21 as in FIG. 4, between all sides, directed laterally towards each other, of the engaged floor panels 1, with the advantage that inclusions which get between the floor panels 1 during the engagement do not exert an adverse influence upon good engagement;

a shaping of the tongue 9 which is such, for example, by the presence of a chamfer 82, that the upper side of the tongue 9 becomes situated from the first joining together or substantial contact of the panels, under the lower side of the upper lip 42 when the floor panels 1 are pushed towards each other in substantially the same plane, as indicated in FIG. 25, with the advantage that the front extremity or end of the tongue 9 does not press against the front side of the upper lip 42 or the front edge of the bottom lip 43 when the floor panels are pushed towards each other in the same plane;

a ramp surface 83, hereinbefore also called inclined portion 41, formed at the distally outer end of the lower lip 43, with the advantage that the locking elements 33-34 shift smoothly over each other and that the lower lip 43 is bent uniformly;

in the engagement direction only one important contact point which is formed by a section 84 at the location of the upperside edges of the floor panels 1, with the advantage that the aforementioned tension force is optimally transferred to the upper side of the floor panels 1 and that the development of openings between the floor panels 1 is counteracted;

contact surfaces 85-86, more particularly abutment surfaces, formed by the upper side of the tongue 9 and the upper side of the groove 10 which, over the largest portion of their length, are flat and run parallel to the plane which is defined by the floor panels 1, as well as contact surfaces cooperating with each other, formed by curvatures 77-78, with the advantage that no mutual displacement in height between two engaged floor panels 1 is possible, even if the insertion depth of the tongue 9 into the groove 10 should vary due to various causes; in other words, no height differences may occur between the adjacent floor panels.

In the embodiment of FIGS. 22 to 25, all these characteristics are combined; it is, however, clear that, as becomes evident from FIGS. 2 to 11, these features can also be provided separately or in a limited combination with one another.

As becomes evident from FIGS. 5 to 7 and 22 to 25, an important characteristic of the preferred embodiment of the invention consists in that the cooperative locking element 6, in other words, the portion providing for the snap-together and engagement effect, are situated in that portion of the lower lip 23-43 which extends beyond the distal edge of the upper lip 22-42, more particularly, the lowermost point 87 of the locking part 33 is situated under the top layer of the floor panel 1. For clarity's sake, this top layer is indicated in the FIGS. 22–25 only as a single layer.

It should be noted that the combination of features, the lower lip 23-43 extending further than the upper lip 22-42; the locking means 6 being formed at least by means of a contact surface portion which inwardly slopes downward, and wherein this portion, at least partially, is located in the portion of the lower lip 23-43 which extends distally beyond the upper lip 22-42, is particularly advantageous, among others, in comparison with the couplings for floor panels described in the documents WO 94/01628, WO 94/26999, WO 96/27719 and WO 96/27721. The sloping contact surface portion offers the advantage that the floor panels 1 can be disassembled again. The fact that this sloping portion is situated in the extended portion of the lower lip 23-43 adds the advantage that no deformations can occur during coupling which manifest themselves up to the top layer.

Figure 22:
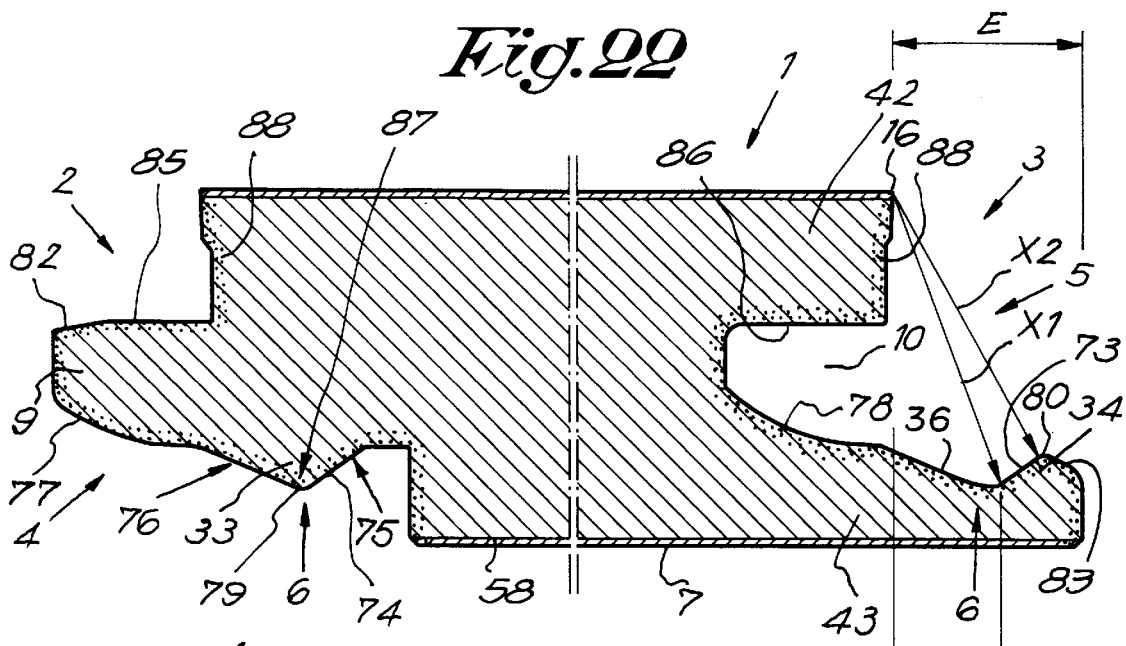
FIG. 22 represents a floor panel according to the invention.

According to a preferred characteristic of the invention, the aforementioned portion, i.e. the contact surface 39 or 73, preferably extends in such a manner that the distance between the upper edge 16 of the panel to the contact surface 39 diminishes between the proximal and distal ends of the sloping contact surface 39, in other words, such that, as represented in FIG. 22, the distance X2 is smaller than the distance X1. This is also the case in FIG. 7.

Still preferably, this portion only starts at a clear distance E1 from the outer edge of upper lip 42.

It is obvious that the coupling parts 22 to 25 can also be shaped by means of said milling process.

According to a particular characteristic of the invention, the floor panels 1 are treated at their sides 2-3 and/or 26-27 with a surface densifying agent, more particularly a surface hardening agent, which preferably is chosen from the following series of products: impregnation agents, pore-sealing agents, lacquers, resins, oils, paraffins and the like.

In FIG. 22, such impregnation 88 is represented schematically. This treatment can be performed over the complete surface of the sides 2-3 and/or 26-27 or only over specific portions hereof, for example exclusively on the surfaces of the tongue 9 and the groove 10.

The treatment with a surface densifying agent offers, in combination with the snap-together effect, the advantage that in various aspects better coupling characteristics are obtained. As a result of this, the coupling parts 4-5 and/or 28-29 better keep their shape and strength, even if the floor panels 1 are engaged and disassembled repeatedly. In particular, if the core 8 is made of HDF, MDF or similar materials, by means of this treatment a better quality of surface condition is obtained, such that no abrasion of material occurs during engaging, or during disassembling.

This treatment also offers the advantage that, at least in the case of a surface hardening, the aforementioned elastic tensioning effect is enhanced.

The present invention is in no way limited to the forms of embodiment described by way of example and represented in the figures, however, can such floor covering and the pertaining floor panels 1 be embodied in various forms and dimensions without departing from the scope of the invention.

For example, the various characteristics which are described by means of the represented embodiments or examples may be selectively combined with each other.

Furthermore, all embodiments of coupling elements described before can be applied at the longer side as well as at the shorter side of a panel.

We claim:

1. A floor covering laminated panel comprising a wood product containing composite core and an upper decorative surface, said panel having an upper side terminating at opposed upper side edges, an underside extending parallel to the upper side, and side edges terminating at said upper side edges at their upper ends and provided with coupling parts integrally formed in one piece with said core, said coupling parts configured to cooperate by coupling with cooperative coupling parts of an identical one of said panel; said coupling parts comprising a tongue and a groove configured to lock together coupled identical ones of said panel in a direction perpendicular to the plane of the coupled panels when cooperative coupling parts of the panels are engaged, said groove and tongue having respective upper and lower sides, and wherein the panel side edge provided with the groove has an upper lip located above and adjacent the upper side of the groove, and terminating at a distal upper lip edge, and a lower lip extending distally beyond said distal upper lip edge in the plane of the panel; said coupling parts including locking elements formed integrally in one piece with said core, said locking elements including cooperative contact surfaces arranged to be engaged when adjacent identical ones of said panel are coupled together with their coupling parts cooperatively engaged to prevent substantial separation of two coupled identical ones of said floor panels at said upper side edges in a direction perpendicular to the edges of the panel sides and parallel to the undersides of the coupled floor panels; said locking means comprising a locking element in the form of a downwardly extending protrusion located on the lower side of the tongue and an upwardly facing cooperating locking recess in the lower lip, said locking recess being located at a position that is at least partially distally beyond a distal edge at which the upper lip terminates, said cooperative contact surfaces defined respectively by said protrusion and said recess, and configured, when engaged in a cooperative relationship upon coupling in a common plane of two identical ones of said panel, to meet each other at a common plane of tangency that with respect to the lower lip is inclined at an angle other than 90° relative to the common plane of the coupled panels, said angle extending inwardly and downward from a distally outer location to a proximal inner location.

2. A floor covering panel according to claim 1, wherein the material of the core, including the locking elements, is constituted of a wood product material consisting of a ground product which, by means of a binding agent, is formed into a unitary composite material.

3. A floor covering panel according to claim 2, wherein the material of the core of the floor panel comprises fiberboard selected from the group consisting of high density fiberboard and medium density fiberboard.

4. A floor covering panel according to claim 2, wherein the material of the core of the floor panel consists of a chip board with fine chips bound together.

5. A floor covering panel according to claim 1, wherein the locking surface defined by the tongue extends downwardly from the lower side of the tongue at an inclination that extends outwardly and downwardly from a proximally inner location to a distally outer location.

6. A floor covering panel according to claim 1, wherein both of said cooperating contact surfaces are inclined relative to the panel underside.

7. A floor covering panel according to claim 6, wherein both contact surfaces are inclined in a generally parallel directions, so that they will at least partially abut each other when cooperative coupling parts of said locking means are coupled together with said contact surfaces located contiguous with each other.

8. A floor covering panel according to claim 1, wherein the contact surface defined by said recess extends inwardly and downwardly from a distal location to a proximal location relative to the panel underside.

9. A floor covering panel according to claim 8, wherein said contact surface is substantially flat.

10. A floor covering panel according to claim 1, wherein said protrusion has a base extending over a substantial width of the lower side of the tongue.

11. A floor covering panel according to claim 1, wherein said recess is distally spaced from said distal upper lip edge.

12. A floor covering panel according to claim 1, wherein said lower lip has an upper side, and wherein the groove lower side extends continuously with the upper side of said lower lip, and an inner end of the groove lower side is located inwardly of the distal upper lip edge, and wherein the lower lip increases in thickness progressively from the inner end of the recess to where it intersects the lower side of the groove, and the lower side of the groove increases in thickness from where it intersects the lip upper side to its proximal inner end.

13. A floor covering panel according to claim 12, wherein the lower lip includes a distal outer end, said distal outer end located distally from the locking recess, said outer end having a maximum thickness measured from the underside of the panel which is smaller than the smallest thickness of the lower side of the groove measured from the underside of the panel.

14. A floor covering panel according to claim 8 wherein the tongue and groove have a shape such that in coupled condition of two identical ones of said floor panel there is provided a chamber defined by a space between a lower surface of the downwardly extending protrusion and an adjacent upper surface of the recess, said chamber being located on the side of said protrusion which is located opposite a side thereof defining one of said contact surfaces.

15. A floor covering panel according to claim 1, wherein the coupling parts are dimensioned to provide a coupling free from play in all panel separation directions in a plane extending perpendicular to the said side edges when two identical ones of said panel are coupled together.

16. A floor covering panel according to claim 1, wherein the locking elements are configured such that when identical ones of said panel are coupled together, upon exertion of a pressure on top of one of the coupled panels which is provided with the tongue adjacent the upper side edge thereof, said locking elements react to the pressure to press the adjacent upper side edges of the coupled panels towards each other.

17. A floor covering panel according to claims 3, wherein a space is provided between the underside of said protrusion and an opposed adjacent surface of said lower lip when identical ones of said panel are coupled together.

18. A floor covering panel according to claim 1, wherein at least the contact surface defined by the recess comprises an inclined surface terminating at a distally outer rounded edge.

19. A floor covering panel according to claim 1, wherein said locking elements are configured and dimensioned such that when two identical ones of said panels are coupled in the same plane with their adjacent upper side edges abutting each other, said floor panels exert a tension force upon each other tending to urge the upper side edges towards each other.

20. A floor covering panel according to claim 19, wherein at least one of the coupling parts comprises an elastically yieldable portion which, when two identical ones of said panel are coupled, is at least partially bent within its elastic yield range to produce said tension force.

21. A floor covering panel according to claim 20, wherein the elastically yieldable portion comprises at least said lower lip at an area thereof located on the proximal side of the contact surface portion, and wherein said lower lip is constituted solely of said laminated panel material.

22. A floor covering panel according to claim 21, wherein the elastically yieldable portion includes the lower side of the groove.

23. A floor covering panel according to claim 1, wherein the coupling parts are configured such that two identical ones of said floor panel can be selectively coupled either by laterally sliding and snapping the cooperative coupling parts together or by turning one panel relative to the other with their cooperative coupling parts partially engaged, whereby additional ones of said floor panel can be sequentially coupled to previously coupled ones of said floor panel by laterally sliding each additional panel into a previously coupled panel, or by relative turning motions of an additional panel relative to a coupled panel.

24. A floor covering panel according to claim 1, wherein the panel has a total thickness between its upper side and its under side, and the distance between the upper side edge of the panel edge including the lower lip and the distal end of the lower lip measured in the plane of the floor panel is smaller than the total thickness of the floor panel.

25. A floor covering panel according to claim 1, wherein the total thickness of the floor panel is approximately 0.5 to 0.8 mm.

26. A floor covering panel according to claim 25, wherein the total thickness of the floor panel is at least 5 mm.

27. A floor covering panel according to claim 1, wherein the floor panel is elongated with said opposed pair of side edges located along its longer sides, and wherein said coupling parts extend along said side edges.

28. A floor covering panel according to claim 1, wherein the floor panel includes two opposed pairs of side edges, and said coupling parts extend in cooperative pairs along all four side edges.

29. A floor covering panel according to claim 28, wherein the cooperative coupling parts of at least two opposed edges are configured and dimensioned such that identical ones of said floor panel can be selectively coupled either by shifting them laterally towards each other approximately in a plane including the panels to engage their coupling parts or by a relative turning movement between the panels with the coupling parts partially engaged.

30. A floor covering panel according to claim 1, wherein a lower side of said protrusion is bordered by at least two portions, including a first portion having a first sloped inclination relative to the panel underside that defines said contact surface, and a second portion having a second sloped inclination relative to the panel underside that is less than the first sloped inclination and which guides the engagement of the coupling parts.

31. A floor covering panel according to claim 1, wherein the locking elements are snap type elements that are configured so as to snap together when cooperative locking elements of two identical ones of said panel are coupled together.

32. A floor covering panel according to claim 1, wherein said common plane of tangency is inclined at an angle of 30 to 70 degrees relative to said common plane.

33. A floor covering panel according to claim 1, wherein the lower side of the tongue is downwardly convexly curved.

34. A floor covering according to claim 33, wherein said convexly curved tongue lower side extends along substantially the complete length of a portion of the tongue located in a complementary groove when identical ones of said panel are coupled with a tongue of one panel located in a complementary groove of an adjacent panel.

35. A floor covering panel according to claim 34 wherein said convexly curved lower side of the tongue is configured and dimensioned such that the tongue is freely insertable into a complementary groove of another panel identical to said panel by turning one panel relative to the other about the upper edge of the panel in which the groove is located and while the cooperative coupling parts are partially engaged.

36. A floor covering panel according to claim 1, wherein an upper surface of the lower lip is curved and is configured to define a guidance surface for guiding the coupling parts of the panels into engagement with each other when said two identical ones of said floor panel are rotated relative to each other with their coupling parts partially engaged.

37. A floor covering according to claim 1, wherein when two identical ones of said panel are coupled together with their cooperative locking surfaces coupled together, spaces defining dust chambers are provided between substantially all laterally opposed sides of the coupled floor panels.

38. A floor covering panel according to claim 1, wherein the configuration of the tongue and the lower lip are such that a tongue of said panel may be lodged in the groove of another identical one of said panels by laterally moving the panels towards each other in approximately a plane including the panels starting from positions at which the panels are completely separated from each other.

39. A floor covering panel according to claim 38, wherein the upper side of the groove of one panel below the upper lip and the upper side of the tongue of the other panel are arranged and configured such that the tongue is guided towards cooperative engagement with the groove when the panels are moved laterally towards each other and approximately upon first contact between the panels.

40. A floor covering panel according to claim 1, wherein the distal end of the lower lip is provided with a sloped ramp surface, said ramp surface configured such that when the tongue of said panel is moved laterally towards the groove of the another identical panel approximately in a plane including the panels to cause engagement of cooperative coupling parts of the panels, the protrusion of said tongue is guided over the distal outer end of the lower lip by said ramp as the tongue traverses said distal outer end of the lower lip.

41. A floor covering panel according to claim 1, wherein apart from said contact surfaces, a contact point resisting mutual panel motion towards each other in a direction perpendicular to the panel side edges occurs between two coupled identical ones of said panel when two such panels are coupled with their cooperative contact surfaces engaged, said contact point located at the adjacent abutting upper side edges of adjacent coupled floor panels.

42. A floor covering panel according to claim 1, wherein said tongue upper side and said groove upper side define engaging abutment surfaces that contact each other when identical ones of said panel are coupled together with a tongue of one panel located in a cooperative groove of another panel, said surfaces extending parallel with a plane including the upper decorative surface, and wherein said abutment surfaces are arranged to guide and maintain said upper side edges in alignment with each other so the upper decorative surfaces are held in alignment.

43. A floor covering panel according to claim 1, wherein the maximum thickness of the lower lip measured from the panel underside and distally of the distal upper lip edge is smaller than the maximum thickness of the upper lip.

44. A floor covering panel according to claims 1, wherein the lower lip is less resistant to bending than the upper lip.

45. A floor covering panel according to claim 1, wherein the upper lip has a chamfered lower edge.

46. A floor covering panel according to claim 1, wherein the contact surfaces are upwardly concave curved with each surface located on a radius centered at the respective adjacent upper edge of the panel, said radii being from 0 to 2 mm different in length from each other.

47. A floor covering panel according to claim 1, wherein when identical ones of said panel are coupled with the panel upper edges in abutment, said contact surfaces meet each other on a circular line having a radius of curvature centered within a circle having a radius of 3 mm and that is centered at the upper edge of the panel including the lower lip.

48. A floor covering panel according to claim 1, wherein the lower lip has a lower side located in the same plane as the underside of the panel and the upper lip has an upper side that is located in the same plane as the upper surface of the panel.

49. A floor covering panel according to claim 1, wherein the upper lip has a lower side that is coextensive with the upper side of the groove, and the lower lip is located completely below the lower side of the upper lip and the upper side of the groove.

50. A floor covering panel according to claim 1, wherein said tongue and groove are dimensioned and configured such that identical ones of said panel can be coupled together from a position where the cooperative coupling parts of the panels are partially engaged by turning one panel relative to the other and with said turning movement centered at the adjacent upper edges of adjacent panels, and such that during the turning movement the tongue of one panel can freely slide into the groove of the adjacent panel.

51. A floor covering panel according to claim 1, wherein the locking elements have rounded edges.

52. A floor covering panel according to claim 1, wherein the panel has a pair of opposed short sides and a pair of opposed longer sides and wherein the locking means are provided on all four sides, and wherein the common plane of tangency of the contact surfaces on the short side has a steeper inclination than on the longer side.

53. A floor covering panel according claim 1, wherein the tongue and the groove each have a profile susceptible to forming by cutting by rotary milling cutters each having a diameter which is at least 20 times larger than the thickness of the floor panel.

54. A floor covering panel according to claim 1, wherein each coupling part on an edge of the panel has a profile which is susceptible to being formed by rotary milling cutters in only two passes.

55. A floor covering panel according to claim 1, wherein the lower lip has an inclined contact surface which extends in such a manner that the distance from the contact surface to the intersection of the upper side of the panel with the adjacent upper side edge diminishes from a proximal inner end of the contact surface to a distal outer end of said contact surface.

56. A floor covering panel according to claim 1, wherein the floor panel is laminated, and in addition to said core layer includes one or more upper layers, including a decorative layer forming said upper decorative surface, and a backing layer on the underside of the panel.

57. A floor covering panel according to claim 1, wherein at least the contact surfaces are treated with a surface densifying agent.

58. A floor covering panel according to claim 57, wherein said coupling parts are formed of fiberboard.

59. A floor covering panel according to claim 1, wherein the coupling parts are configured so that the panel can be coupled to an identical panel with their cooperative coupling parts engaged and locked against lateral and vertical separation without glue, whereby the panels can be freely disassembled and recoupled together.

60. The floor covering panel according to claim 59, wherein the panel has a pair of opposed short sides and a pair of opposed longer sides and wherein the locking means are provided on all four sides.

61. A method for manufacturing a floor panel claimed in claim 1, comprising milling each of the tongue and groove by means of rotary milling cutters which are positioned at different angles in respect to the floor panel, and carrying out complete milling of each of the tongue and groove in only two passes.

62. The method according to claim 61, wherein during each of the milling passes, the final shape of one flank of the tongue or the groove is completely formed.

63. The method according to claim 61, wherein during each pass, milling cutters which extend outside the groove and the tongue are applied to the panel edges, said milling cutters having diameters which are from 5 times larger than the thickness of the floor panel to 20 times larger than the thickness of the floor panel.

64. The method according to claim 61, including forming a cooperative coupling part profile on all four sides of the floor panel by displacing the floor panel along two perpendicular directions during milling such that during one of the movements in one direction profiles along two opposite edges of the panel are simultaneously milled and during the movement in the perpendicular direction profiles are simultaneously milled along the remaining opposed edges.

65. A floor covering laminated panel comprising a wood product containing composite core and an upper decorative surface, said panel having an upper side terminating at opposed upper side edges, an underside extending parallel to the upper side, said underside including a backing layer, and side edges terminating at said upper side edges at their upper ends and provided with coupling parts integrally formed in one piece with said core, said coupling parts configured to cooperate by coupling with cooperative coupling parts of an identical one of said panel; said coupling parts comprising a tongue and a groove configured to lock together coupled identical ones of said panel in a direction perpendicular to the plane of the coupled panels when cooperative coupling parts of the panels are engaged, said groove and tongue having respective upper and lower sides, and wherein the panel side edge provided with the groove has an upper lip located above and adjacent the upper side of the groove, and terminating at a distal upper lip edge, and a lower lip extending distally beyond said distal upper lip edge in the plane of the panel; said coupling parts including locking elements formed integrally in one piece with said core, said locking elements including cooperative contact surfaces arranged to be engaged when adjacent identical ones of said panel are coupled together with their coupling parts cooperatively engaged to prevent substantial separation of two coupled identical ones of said floor panels at said upper side edges in a direction perpendicular to the edges of the panel sides parallel to the undersides of the coupled floor panels; said locking elements comprising a locking element in the form of a downwardly extending protrusion located on the lower side of the tongue and an upwardly facing cooperating locking recess in the lower lip, said cooperative contact surfaces defined respectively by said protrusion and said recess, and configured, when engaged in a cooperative relationship upon coupling in a common plane of two identical ones of said panel, to meet each other at a common plane that, with respect to the lower lip, is inclined at an angle of 30° to 70° relative to the common plane of the coupled panels, said angle extending inwardly and downward from a distally outer location to a proximal inner location; said composite core comprising a fiberboard; said contact surfaces both being inclined with respect to the lower lip, the inclination of said contact surfaces extending inwardly and downwardly from a distally outer location to a proximal inner location with respect to the lower lip; said contact surfaces located distally beyond said upper lip distal upper lip edge; said coupling parts being dimensioned to provide a coupling free from play in all panel separation directions in a plane extending perpendicular to the side edges when two identical ones of said panel are coupled together; said coupling parts being configured such that two identical ones of said floor panel can be selectively coupled either by laterally sliding and snapping the cooperating coupling parts together or by turning one panel relative to the other with their cooperative coupling parts partially engaged; said lower lip being elastically yieldable at least when two identical ones of said floor panel are coupled by laterally sliding and snapping the cooperative coupling parts together; the complete thickness of said panel is less than 1.5 cm.; and said tongue and groove each having a profile susceptible to forming by cutting by rotary milling cutters.

66. A floor covering panel according to claim 65, wherein the common plane of meeting of the contact surfaces on the short side has a steeper inclination than on the longer side.

* * * * *

UNITED STATES PATENT AND TRADEMARK OFFICE
CERTIFICATE OF CORRECTION

PATENT NO. : 6,006,486
DATED : December 28, 1999
INVENTOR(S) : Stefan Moriau et al.

Page 1 of 1

It is certified that error appears in the above-identified patent and that said Letters Patent is hereby corrected as shown below:

Column 14,
Line 12; change "means" to -- elements --

Column 16,
Line 15; "mm," to -- cm. --

Column 18,
Line 60; change "means" to -- elements --

Signed and Sealed this

Twenty-first Day of August, 2001

Attest:

NICHOLAS P. GODICI
Attesting Officer
Acting Director of the United States Patent and Trademark Office